United States Patent [19]

Edgerton, Jr.

[11] Patent Number: 5,347,682
[45] Date of Patent: Sep. 20, 1994

[54] TWO POSITION FLOOR LOCK AND CASTER ASSEMBLY

[75] Inventor: John L. Edgerton, Jr., Stevens Point, Wis.

[73] Assignee: Joerns Healthcare Inc., Stevens Point, Wis.

[21] Appl. No.: 12,326

[22] Filed: Feb. 2, 1993

[51] Int. Cl.⁵ ............................................. B60B 33/06
[52] U.S. Cl. ........................................... 16/34; 16/32
[58] Field of Search ................................ 16/32-34; 5/510; 280/43.24

[56] References Cited

U.S. PATENT DOCUMENTS

| | | | |
|---|---|---|---|
| 146,997 | 2/1874 | Eddy | 5/510 |
| 721,610 | 2/1903 | Scott | 5/510 |
| 746,636 | 12/1903 | Lawrence . | |
| 1,092,220 | 4/1914 | Koch et al. | 16/34 |
| 1,636,325 | 7/1927 | Roe | 16/33 |
| 1,902,166 | 3/1933 | Harter | 16/34 |
| 1,931,446 | 10/1933 | Muller . | |
| 1,999,106 | 4/1935 | Muller . | |
| 2,697,243 | 12/1954 | Shager . | |
| 2,783,055 | 2/1957 | Michaud . | |
| 2,798,652 | 7/1957 | Easton | 16/33 |
| 3,488,064 | 1/1970 | Moe | 16/35 R |
| 3,676,881 | 7/1972 | Duprey . | |
| 4,249,282 | 2/1981 | Little . | |
| 4,385,414 | 5/1983 | Damico . | |
| 4,588,203 | 5/1986 | Anderson . | |
| 4,927,105 | 5/1990 | Habermann . | |
| 4,940,110 | 7/1990 | Svensson et al. | 280/43.24 |
| 5,105,486 | 4/1992 | Peterson . | |
| 5,160,010 | 11/1992 | Peterson . | |
| 5,161,814 | 11/1992 | Walker | 280/43.24 |

FOREIGN PATENT DOCUMENTS

| | | | |
|---|---|---|---|
| 530750 | 8/1930 | Fed. Rep. of Germany | 16/34 |
| 4-8603 | 1/1992 | Japan | 16/34 |
| 138391 | 12/1952 | Sweden | 5/510 |
| 163829 | 11/1933 | Switzerland | 5/510 |
| 258003 | 9/1926 | United Kingdom | 5/510 |
| 680819 | 10/1952 | United Kingdom | 16/34 |

*Primary Examiner*—Lowell A. Larson
*Assistant Examiner*—Donald M. Gurley
*Attorney, Agent, or Firm*—Price, Heneveld, Cooper, DeWitt & Litton

[57] ABSTRACT

A two position floor lock and caster assembly for a bed or the like includes a bracket adapted to be secured to the bed frame. A pair of links have ends pivoted to the bracket and free ends. A socket is pivotally joined to the free ends of the links so that rotation of the links raises and lowers the socket. A caster may be secured to the bracket or attached to the socket. A foot or floor lock may be secured to the bracket or the socket. A crank assembly is operatively connected to the links for raising and lowering the socket to move the floor lock or caster into operative engagement with the floor.

15 Claims, 5 Drawing Sheets

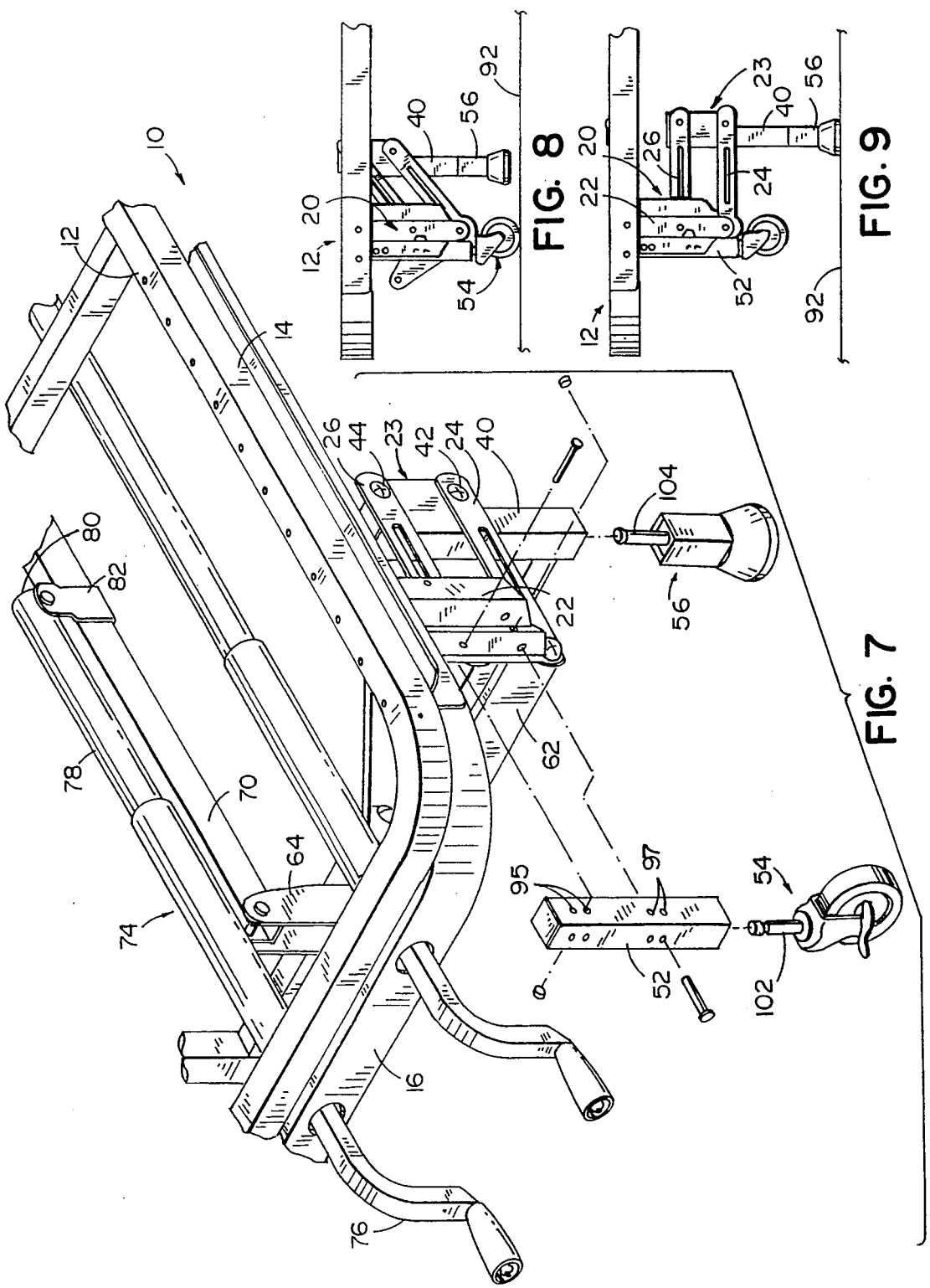

TWO POSITION FLOOR LOCK AND CASTER ASSEMBLY

BACKGROUND OF THE INVENTION

The present invention relates to beds and, more particularly, to floor lock assemblies for beds and the like.

Hospital, nursing home and extended care beds are typically provided with caster assemblies on at least one end thereof so that the bed can be more easily moved by staff. In some assemblies, the caster wheel is locked to limit or prevent movement of the bed. Such a bed is, however, less stable than one in which the legs directly contact the floor. In order to provide such improved stability, it has been proposed to provide retractable caster assemblies. When the caster assemblies are in their raised positions, the legs or feet of the bed directly engage the floor. The bed is locked in position due to the weight of the bed. When it is necessary to move the bed, the casters are extended and moved into engagement with the floor raising the feet or legs. The bed may then be freely moved on the caster wheels. Examples of prior beds including caster assemblies may be found in commonly owned U.S. Pat. No. 4,385,414 entitled CASTER FOR ADJUSTABLE BEDS AND THE LIKE, which issued on May 31, 1983 to Damico and commonly owned U.S. Pat. No. 5,105,486 entitled ADJUSTABLE BED, which issued on Apr. 21, 1992 to Peterson.

Generally, the caster assemblies raise the bed frame relative to the ground when movement is desired. In many instances, however, it may be desirable to have the bed position locked and stable when the bed is in a raised position. The bed may be raised for patient treatment, patient feeding, changing of bedding and the like. Many beds are provided with separate high/low mechanisms to raise the mattress frame of the bed as shown, for example, in the aforementioned U.S. Pat. No. 5,105,486.

Various problems exist with the prior devices. Available caster and lock assemblies may provide little, if any, height adjustment. Available assemblies may be limited in versatility and have, generally, a single lock position, that is, the legs or floor locks engage the floor when the bed is in a low position. Individual caster locks may need to be separately operated to release or lock the caster wheels or to move the casters into position. Only limited adjustability and versatility may be provided.

SUMMARY OF THE INVENTION

In accordance with the present invention, the aforementioned problems are substantially solved or eliminated. Essentially, a floor lock assembly is provided which includes a bracket, a pair of links having ends pivoted to the bracket and a socket member pivotally joined to the links at their free ends. Rotation of the links will raise and lower the socket member with respect to the floor.

A caster and foot or floor lock are provided. In one form, the caster is secured to the socket member and the foot is fixed in position with respect to the bracket. The bed will, therefore, be raised when the links are moved to position the caster in a roll position. The bed will be in its lower most position when the foot or floor lock contacts the floor. In the alternative, the floor lock is secured to the socket member and the caster is fixed to the bracket. When so configured, the bed is in its lowest position when the caster contacts the floor and the assembly is in the roll position. When the assembly is moved to the lock position, the bed is raised.

In narrower aspects of the invention, a plurality of floor lock assemblies are provided at the head and foot ends of the bed. An actuator link interconnects the floor assemblies. A crank or other actuator means shifts the actuator link to simultaneously raise and lower the socket member of each floor lock assembly. Infinite adjustability between low and high positions is achieved.

BRIEF DESCRIPTION OF THE DRAWINGS

FIG. 7 is an enlarged, fragmentary, perspective view of a bed with a floor lock and caster assembly in the alternative configuration in accordance with the present invention;

FIG. 8 is a partial, side, elevational view of the assembly of FIG. 7 showing the caster in engagement with the floor; and FIG. 9 is a partial, side, elevational view of the assembly of FIG. 7 showing the bed raised with the floor lock in engagement with the floor.

DETAILED DESCRIPTION OF THE PREFERRED EMBODIMENT

Figure 1:
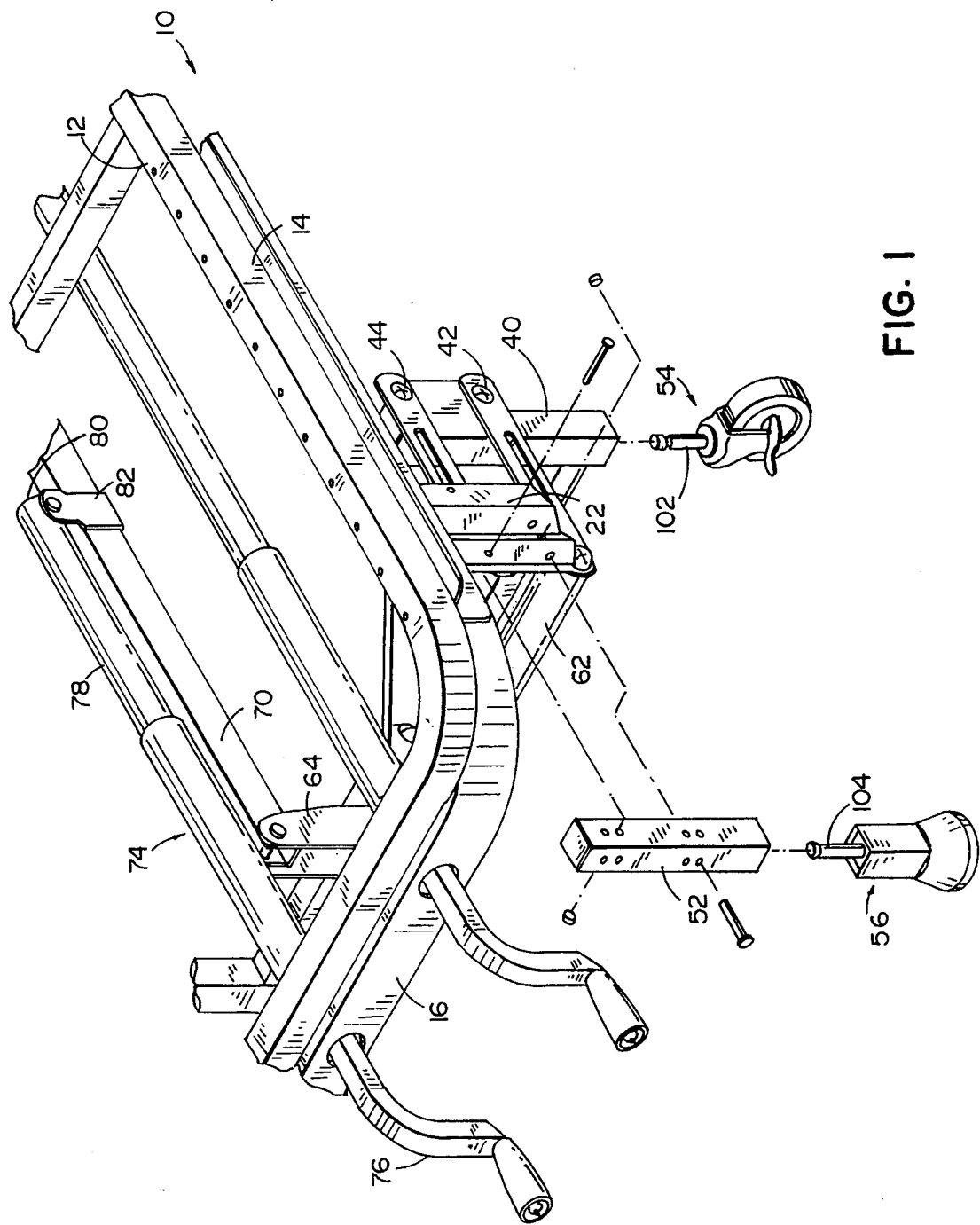
FIG. 1 is a fragmentary, perspective view of a bed incorporating a floor lock and caster assembly in accordance with the present invention.

A preferred embodiment of a bed with a floor lock and caster assembly in accordance with the present invention is illustrated in the drawings and generally designated by the numeral 10. Bed 10 includes a frame 12. Frame 12 includes side rail portions 14 and end rail portions 16, 18.

Figure 4:
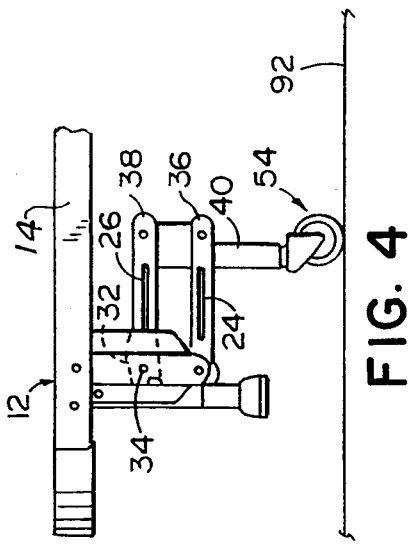
FIG. 4 is a fragmentary, side, elevational view of the bed of FIG. 1 showing the bed in the raised, roll position.
Figure 5:
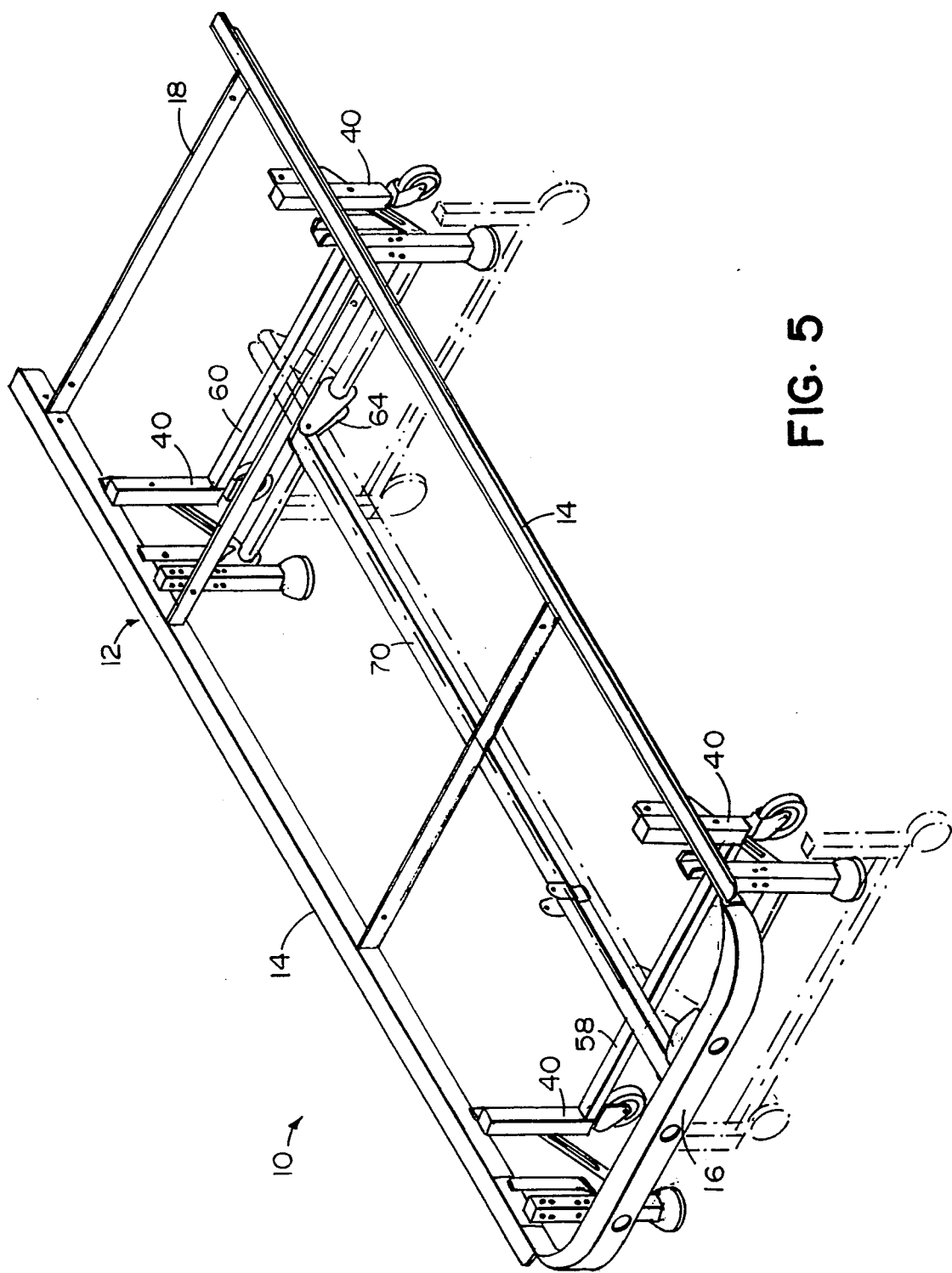
FIG. 5 is a perspective view of a portion of a bed with a floor lock and caster assembly in accordance with the present invention.
Figure 6:
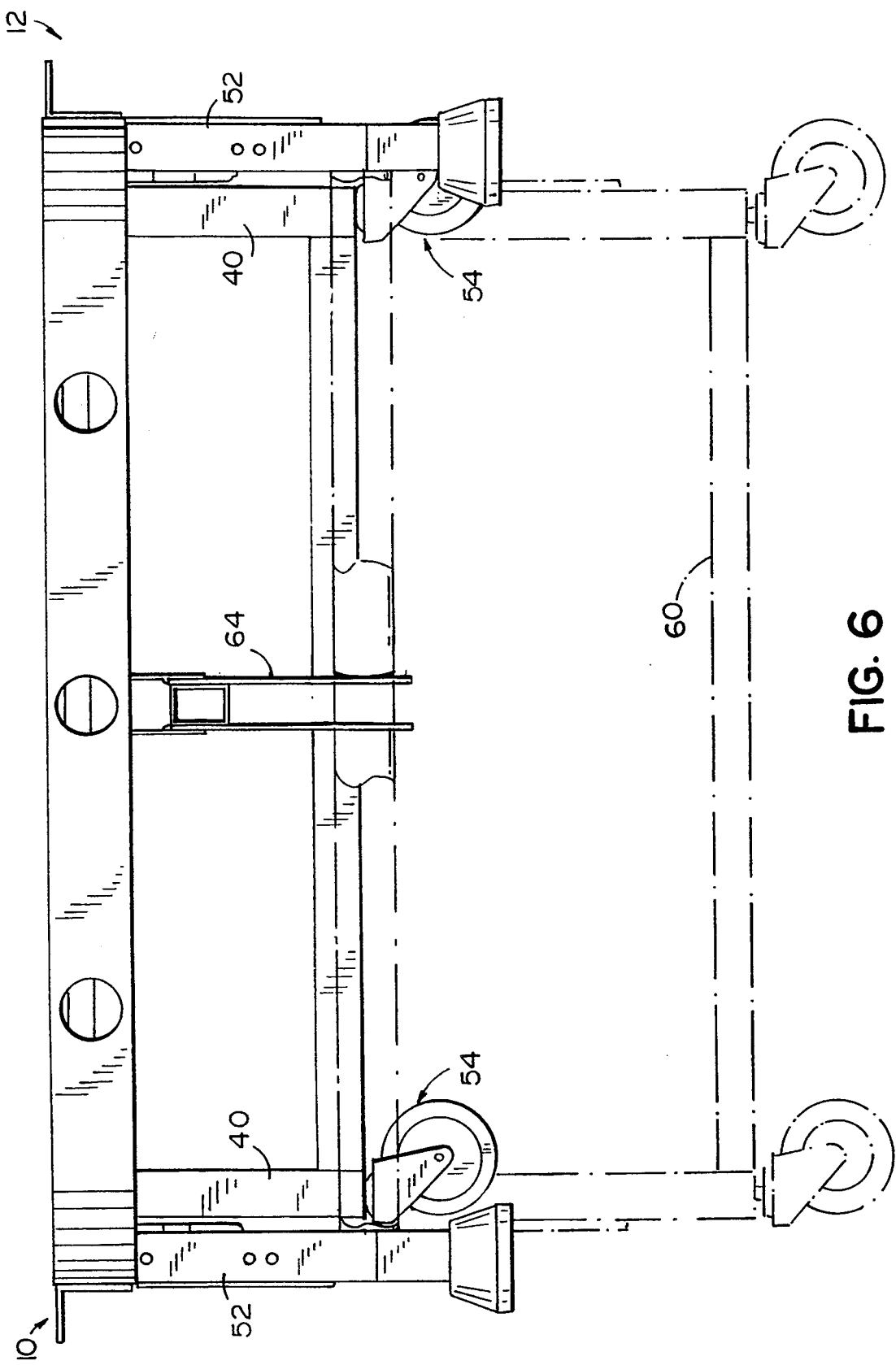
FIG. 6 is an end, elevational view of a bed with a floor lock and caster assembly in accordance with the present invention.

Floor lock and caster subassemblies 20 are positioned at the head and foot ends of side rail portions 14. Each subassembly 20 includes a bracket 22 welded or otherwise affixed to side rail 14. A linkage 23 includes a first or lower link 24 and a second or upper link 26. Link 24 is pivoted at an end 28 to bracket 22 at pivot point 30. Upper link 26 is pivoted at an end 32 (FIG. 4) to bracket 22 at pivot point 34. Links 24, 26 include free ends 36, 38. A generally tubular socket 40 is pivotally attached to free ends 36, 38 of links 24, 26 at pivot points 42, 44. In the configuration illustrated in FIGS. 1-6, a second socket 52 is attached to bracket 22. As shown, a caster wheel 54 is attached to socket 40. A foot or floor lock 56 is attached to socket 52. In the preferred form and as seen in FIGS. 5 and 6, transverse members 58, 60 extend between sockets 40 to rigidify the subassemblies.

An actuator is provided to gang subassemblies 20 together for simultaneous operation. In the preferred form, transverse crank members or tubes 62 extend between opposed brackets 22. Links 24 are fixed to members 62 so that rotation of members 62 rotates or pivots opposed links 24. A crank arm 64 is fixed to crank members 62 intermediate the ends thereof. An actuator link 70 interconnects crank arms 64 at the head and foot ends of bed frame 12. Movement of link 70 longitudinally of frame 18 rotates crank arms 64 and, hence, crank members or tubes 62 and pivots links 24. Bracket 22, links 24, 26 and socket 40 define a parallelogram four-bar linkage.

Figure 3:
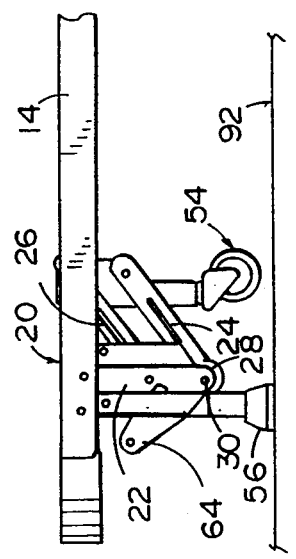
FIG. 3 is a fragmentary, side, elevational view of the bed and floor lock assembly of FIG. 1 showing the bed in the locked position.
Figure 2:
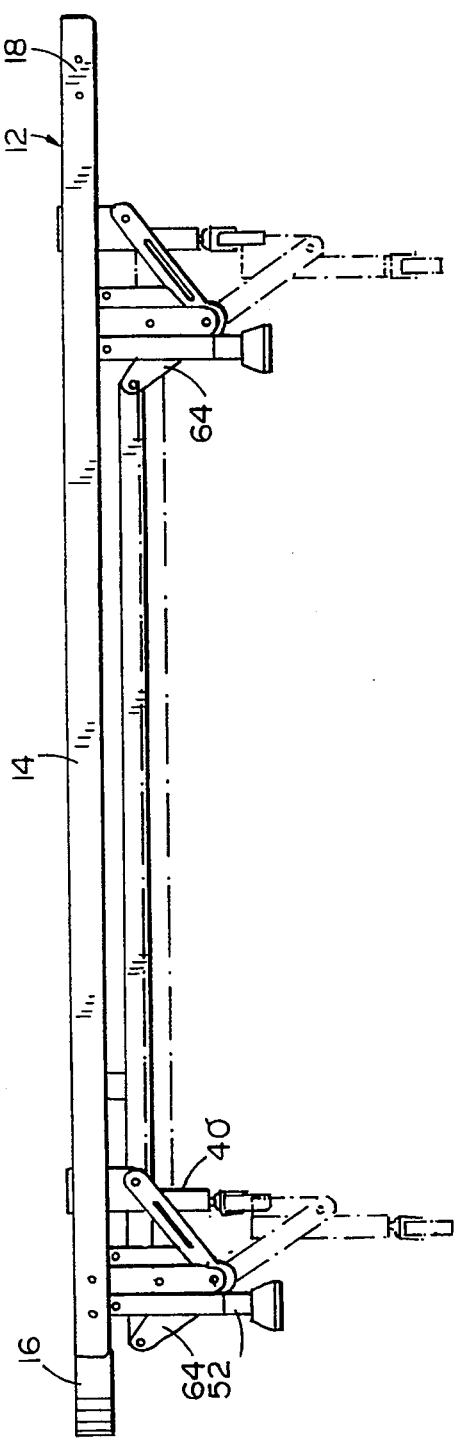
FIG. 2 is a side, elevational view of a bed showing a portion of the floor lock and caster assembly in accordance with the present invention.

As seen in FIG. 1, provision is made for shifting actuator link 70 to raise and lower sockets 40. In the preferred form, a hand crank assembly 74 is supported at frame portion 16. Assembly 74 includes a hand crank 76 and an extensible and retractable member 78. Member 78 is pivoted at an end 80 to a bracket 82. Bracket 82 is, in turn, secured to or fixed to 1 ink 70. Extension and retraction of member 78 upon rotation of hand crank 76 will, therefore, shift link 70 between first and second positions. When in the first position, socket 40 is in a raised position, as illustrated in FIG. 3 and as shown in solid lines in FIGS. 2, 5 and 6. Feet or floor locks 56 are in solid contact with floor 92. Actuation of crank assembly 74 rotates the crank arms clockwise from the position shown in FIGS. 2 and 3 to a fully raised position as shown in FIG. 4 and in phantom lines in FIGS. 2, 5 and 6. Subassemblies 20 have been moved from a lock position to a raised or roll position with casters 54 in contact with the floor 92 and bed frame 12 raised. The parallelogram linkage maintains socket 40 in a vertical orientation throughout the range of movement. The configuration, as illustrated in FIGS. 1–6, maintains bed frame 12 in the lowest position when locks 56 are in contact with the floor. Assemblies 20 are in their lock position. When links 24, 26 are rotated through action of crank assembly 74, the bed is raised by contact of casters 54 with ground. Assemblies 20 are now in a roll position. The height position of the bed frame is infinitely variable between the lower most position or range of motion of assemblies 20.

In an alternative configuration as illustrated in FIGS. 7–9, floor lock 56 is fixed to socket 40. Caster wheel 54 is fixed to socket 52. As shown in FIG. 8, crank assembly 74 initially positions actuator link 70 in its first position. Bed frame 12 is in its lower most position and caster 54 is in contact with the floor 92. Foot 56 is raised out of contact with the floor. Assemblies 20 are in the roll position. Assemblies 20 are each in their roll positions. The bed is moveable in its lowest position relative to the floor. Actuation of crank 74 rotates links 24, 26 clockwise, as shown in FIG. 9. Floor lock 56 is moved into contact with floor 92 and the bed is raised. Assemblies 20 are in their lock position. When locks 56 are fully lowered, frame 12 is in its fully raised or high position. The patient will be raised for treatment, care and the like. The bed is in a stable configuration.

In either configuration, sockets 52 are provided with multiple, spaced apertures 95, 97. Apertures 95, 97 permit adjustment in the positioning of sockets 52 relative to bracket 22. This allows adjustment in height of socket 52 with respect to the bracket 22 to accommodate various caster sizes.

Sockets 40, 52 are tubular in shape. The sockets accommodate the caster wheels 54 and floor locks 56 in a snap-fit fashion. The casters and feet each include stems 102, 104 which are received and engaged by sockets 40, 52 in a conventional fashion.

The individual subassemblies 20 in accordance with the present invention increase the versatility of the floor lock mechanism. The interchangeability of the caster and floor lock provides two lock positions or two modes of operation. The individual assemblies are ganged together through the crank mechanism so that common operation is achieved. The bed may be rolled in its raised position or rolled in its lowered position depending upon the positioning of the caster and the foot or floor lock. The four-bar parallelogram linkage insures that the sockets 40 are maintained in a vertical orientation throughout their range of movement. The subassemblies in accordance with the present invention are relatively easily manufactured and assembled. The floor lock and caster assembly is easily and readily incorporated into conventional beds.

In view of the above description, those of ordinary skill in the art may envision various modifications which would not depart from the inventive concepts disclosed herein. A motor drive, for example, could be substituted for the hand crank. The above description should, therefore, be considered as only that of the preferred embodiment. The true spirit and scope of the present invention may be determined by reference to the appended claims.

The embodiments of the invention in which an exclusive property or privilege is claimed are defined as follows:

1. A floor lock and caster assembly comprising:
   a bracket;
   a socket;
   connecting means between the bracket and socket for connecting the socket to said bracket for movement between extended and retracted positions;
   a caster including means for permitting said caster to be interchangeably secured to one of said bracket and said socket;
   a floor lock including means for permitting said floor lock to be interchangeably secured to the other of said bracket and said socket; and
   actuator means connected to said connecting means for moving said socket between said positions.

2. A floor lock and caster assembly as defined by claim 1 wherein said connecting means comprises a pair of links, each link having an end directly pivoted to said bracket and an end directly pivoted to said socket.

3. A floor lock and caster assembly as defined by claim 2 wherein said actuator means comprises:
   a crank arm fixed to one of said links; and
   a crank assembly operatively connected to said crank arm.

4. A floor lock and caster assembly as defined by claim 2 wherein said bracket, said links and said socket define a four-bar linkage.

5. A floor lock and caster assembly comprising:
   a bracket;
   a socket;
   connecting means between the bracket and socket for connecting the socket to said bracket for movement between extended and retracted positions;
   a caster secured to one of said bracket and said socket;
   a floor lock secured to the other of said bracket and said socket; and
   actuator means connected to said connecting means for moving said socket between said positions, wherein said connecting means comprises a pair of links, each link having an end pivoted to said bracket and an end pivoted to said socket, wherein said bracket, said links and said socket define a four-bar linkage, and wherein said four-bar linkage is a parallelogram linkage.

6. A floor lock and caster assembly as defined by claim 5 further including another socket fixed to said bracket.

7. A floor lock and caster assembly as defined by claim 6 wherein said caster is fixed to said a socket and said floor lock is fixed to said another socket.

8. A floor lock and caster assembly as defined by claim 6 wherein said floor lock is fixed to said a socket and said caster is fixed to said another socket.

9. A floor lock and caster assembly as defined by claim 7 wherein said actuator means comprises:
   a crank arm fixed to one of said links; and
   a crank assembly operatively connected to said crank arm.

10. A floor lock and caster assembly as defined by claim 8 wherein said actuator means comprises:
    a crank arm fixed to one of said links; and
    a crank assembly operatively connected to said crank arm.

11. An assembly for use with a bed frame having a head end and a foot end, said assembly comprising:
    an elongated actuator link having ends;
    an actuator means mountable on the bed frame and connected to said link for moving said link between first and second positions; and
    a pair of linkage subassemblies, one of said subassemblies being attachable at the head end of said bed frame and the other of said subassemblies being attachable at the foot end of said bed frame, each of said subassemblies including:
    a pair of spaced support brackets;
    a crank member extending between and being rotatably mounted on said brackets;
    a crank arm fixed to said crank member and being pivoted to said actuator link so that movement of said actuator link rotates said crank member;
    a pair of spaced, first links, each of said first links having an end fixed to said crank member and a free end;
    a pair of spaced, second links, each of said second links having an end pivoted to one of said support brackets and a free end; and
    a pair of sockets, each socket being pivotally connected to free ends of one of said first and second links for movement between raised and lowered positions upon movement of the actuator link.

12. An assembly as defined by claim 11 wherein each of said linkage subassemblies further comprises a pair of casters, each caster being attached to one of said brackets and said sockets.

13. An assembly as defined by claim 11 wherein each of said linkage subassemblies further comprises a second pair of sockets, each socket of said second pair of sockets being fixed to one of said brackets.

14. An assembly as defined by claim 13 wherein each of said linkage subassemblies further comprises:
    a pair of casters, each caster being secured to one of said socket of said first recited pair of sockets; and
    a pair of floor locks, each floor lock being secured to one of said sockets of said second pair of sockets.

15. An assembly as defined by claim 13 wherein each of said linkage subassemblies further comprises:
    a pair of floor locks, each floor lock being secured to one of said sockets of said first recited pair of sockets; and
    a pair of casters, each caster being secured to one of said sockets of said second pair of sockets.

* * * * *